G. E. BOBERG.
PROCESS FOR TREATING PEAT.
APPLICATION FILED AUG. 13, 1910.

993,143.

Patented May 23, 1911.
9 SHEETS—SHEET 6.

G. E. BOBERG.
PROCESS FOR TREATING PEAT.
APPLICATION FILED AUG. 13, 1910.

993,143.

Patented May 23, 1911.
9 SHEETS—SHEET 7.

G. E. BOBERG.
PROCESS FOR TREATING PEAT.
APPLICATION FILED AUG. 13, 1910.

993,143.

Patented May 23, 1911.
9 SHEETS—SHEET 8.

Witnesses
Inventor
G. E. Boberg
By
Attorneys

UNITED STATES PATENT OFFICE.

GUSTAF E. BOBERG, OF ALAMEDA, CALIFORNIA.

PROCESS FOR TREATING PEAT.

993,143.  Specification of Letters Patent.  Patented May 23, 1911.

Application filed August 13, 1910. Serial No. 576,953.

*To all whom it may concern:*

Be it known that I, GUSTAF EMIL BOBERG, a subject of the King of Sweden, residing at Alameda, in the county of Alameda and State of California, have invented certain new and useful Improvements in Processes of Treating Peat, of which the following is a specification.

This invention relates to a process and apparatus for treating peat in such a manner that the water contained therein may be removed in order that the peat may be profitably utilized as a fuel.

Peat as it exists in its raw state contains a jelly-like substance known as pectic acid which, when exposed constantly to heat, becomes transformed into a substance known as hornoid, and the more heat this substance is subjected to, the harder it becomes, thus forming an impenetrable shell about the peat, retaining the water therein and making it impossible to use the peat as a fuel.

It is one of the objects of the present invention to take the raw peat, remove all foreign substances therefrom such as roots, sticks, stones, and the like, and treat the peat, removing the water and gases and leaving only the carbon to be used as a fuel. After the gases and water have been removed from the peat, the peat is molded into briquets, which are held together by the natural binding substance in the peat.

Among other objects, the present invention accumulates the gas given off from the peat during two steps in the process, that is, during the initial removal of the gas and water, and the subsequent removal of the gas in drying the briquets. The pectic acid which must be removed, the water and the gases are contained in the vegetable cells of the raw peat and to remove these elements, it is necessary to burst these cells. The present process and apparatus utilize the air which is retained in the raw peat, or the vegetable cells thereof, to burst each individual cell, and thus liberate the undesirable but useful elements.

With the above and other objects in view, this invention consists of the construction, combination and arrangement of parts all as hereinafter more fully described, claimed and illustrated in the accompanying drawings wherein:

The process of removing the gases from the peat comprises a number of steps, the first of which is the removal of the roots, sticks, stones, and the like from the peat, and at the same time saturating the same with water. This saturation causes the peat to become a soft plastic mass which may be readily handled, said mass being of substantially the same consistency throughout. After this step in the process, the peat is fed into an air tight chamber, being forced through said chamber and subjected to heat at the same time. This air tight chamber is substantially a perfect vacuum, the gases, vapors and air which the peat gives up being constantly exhausted therefrom by a vacuum pump, said gases, vapors and air being purified and accumulated in a reservoir. While this peat is in the vacuum chamber, it is constantly acted upon by a stirring or breaking up mechanism which loosens the various particles of the peat and permits the same to be subjected to the heat. By treating the peat in a vacuum chamber, and subjecting the same to heat, the individual cells of the mass burst from the internal pressure thereof, giving off the pectic acid as a gas and vapor, and also spreading through the peat a natural binding substance which aids in molding the peat and which does not in any manner interfere with the use of the peat as a fuel.

It is sufficient that the peat in the vacuum chamber be heated above the boiling point, preferably to about 80° F., and not above 110° F. because at the latter temperature, the pectic acid becomes confined in the cellular elements of the peat by the formation of the hornoid hereinbefore referred to. The peat is then taken from the vacuum chamber and passed through the compression rollers which squeeze the majority of the superfluous water therefrom, or that water which is not positively embodied in the peat. The peat at this point may be used as a fuel without the forming of the hornoid, and as a result, a portion thereof is fed to the furnaces to create the heat necessary to operate under the vacuum chamber and the drying furnace as hereinafter more fully described. The majority of the peat, however, is conducted by carriers to a molding machine where it is formed into briquets of any suitable size, said briquets, however, being damp and not in a condition to be handled or placed upon the market. To harden the peat and yet permit the same to retain its utility as a fuel, the briquets are placed individually in a boiler which is substantially air tight, and which has an automatic gas outlet. This boiler is placed in a furnace and subjected to an approximately high degree of heat. The application of heat to the briquets in an air tight boiler, causes the same to dry, giving off a gas and vapor which passes from the boiler through the automatic gas outlet and is accumulated in a similar manner to the gases drawn from the vacuum chamber. This application of heat also causes the natural binding material contained within the peat to form the latter into briquets which, under ordinary use, will not become broken or damaged. After the briquets have been taken from the boiler, the same are in condition to be marketed, and in using the same as a fuel, the hornoid crust does not form and the entire briquet is consumed.

Figure 1:
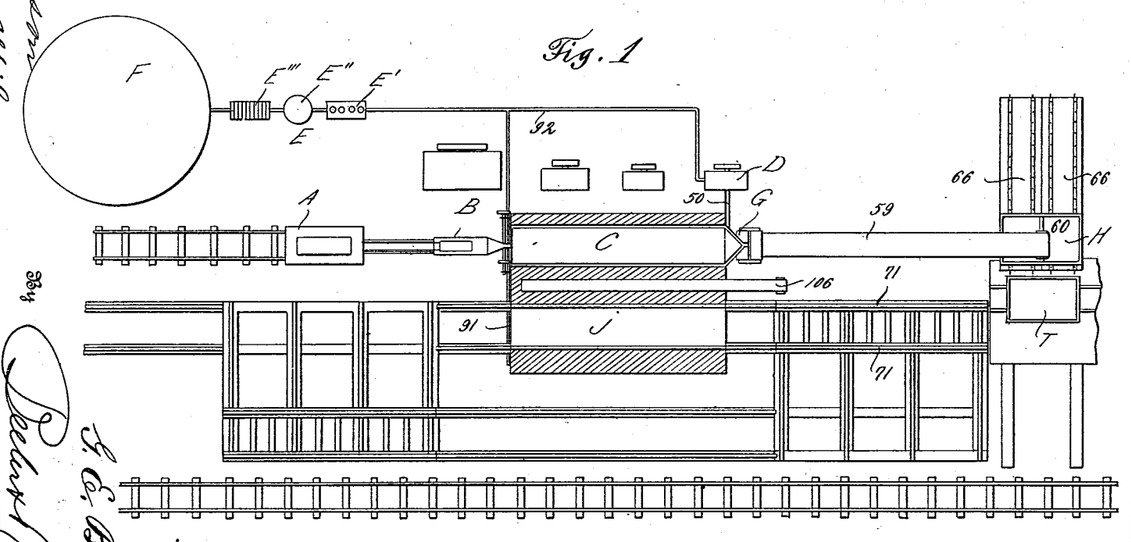
Figure 1 is a diagrammatic top plan view of the plant used in carrying out the process of the present invention.

Referring generally to the plant which carries out the operation hereinbefore described, A indicates the mixing machine wherein the roots, stones, sticks, and the like are removed from the peat, and the latter is formed into a soft plastic mass. This soft plastic mass is then delivered to a feeding mechanism B, from which the mass is delivered to the vacuum chamber or boiler C. The gases are exhausted from this vacuum boiler by the vacuum pump D, and are then passed through the purifying apparatus indicated generally as E, said purifying apparatus comprising a cold water tank E', sulfuric acid tank E'' and the purifier E''', after which the gas passes to the reservoir F. The peat is delivered from the vacuum boiler C to the compression rollers G and is then conveyed to the molding machine indicated generally as H, from which it is delivered to a drying or extracting boiler which is placed in the drying furnace J, said drying furnace being located adjacent to the vacuum chamber.

Figure 11:
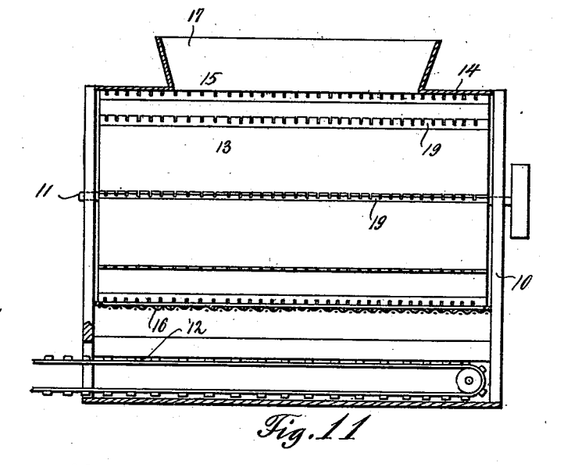
Fig. 11 is a central longitudinal section of the device which removes all foreign matter from the peat previous to placing the same in the vacuum chamber.
Figure 15:
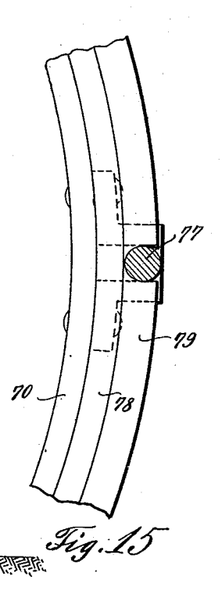
Fig. 15 is a fragmentary end elevation of the boiler illustrating the locking mechanism thereof.

Referring to the mixer A, or the mechanism by which the roots, sticks, stones, and the like are removed from the peat, 10 indicates a hopper, on the upper edges of which operates the longitudinally extending shaft 11. A conveyer 12 operates throughout the entire length of the hopper in the base thereof, and extends to the feeding mechanism, being adapted to deliver the peat from the mixer to the feeding mechanism. An inner drum 13 is rigidly carried by the shaft 11 and is contained within the outer drum 14 which is stationary and secured to the ends of the hopper 10, the latter drum having an opening 15 in the top thereof and a screened opening 16 in the bottom thereof, the opening 15 being surrounded by a flange 17. The drum 14 has a series of knives 18 mounted on the inner face thereof in spaced relation, said knives being adapted to coöperate with the spring pressed tail-plate 19 carried by the inner drum 13. The peat is fed into the opening 15 and between the drums 13 and 14, at the same time having a certain percentage of water added thereto. The rotation of the drum 13 within the drum 14 causes the peat to be forced against the knives by the tail plates 19 carried by the inner drum 13, thus causing the peat to be cut and thoroughly mixed, forming a homogeneous mass. The rotation of the drum 13 forces this finely divided peat with the accompanying water through the screened opening 16, the peat falling upon the conveyer 12 which carries the same to the feeding mechanism B. The foreign matter which is originally contained within the raw peat is retained in the drum 14 and is removed by any suitable means.

The carrier 12 located in the bottom of the hopper 10 delivers the homogeneous mass of peat to a hopper 20 located on the cylindrical feed casing 21, the forward terminal of said feeding casing being tapered and provided with a reduced straight portion 22. A shaft 23 is rotatably mounted in the casing 21 and is driven by a pulley 24, said shaft being surrounded by a worm 25 which conveys the peat into the tapered portion and through the reduced straight portion 22. It will be seen from this construction, that as the peat is packed into the decreased straight portion 22, it will create substantially an air tight closure in said opening. The opening of the straight portion 22 delivers the peat into the vacuum chamber C which forms one of the principal steps in the process. This vacuum chamber comprises a structure which has a longitudinal opening extending therethrough. A shaft 25' extends through this opening and has rigidly mounted thereon the drum or cylinder 26, the forward extremity 27 thereof being tapered. This drum or cylinder is surrounded by a worm 28 which extends throughout the entire length thereof, and which is adapted to receive the peat from the delivery opening 22 and carry the same throughout the vacuum chamber. The shaft 25 at the rear terminal thereof projects through the end of the vacuum casing hereinafter more fully described, and has mounted thereon the large geared disk 29 which meshes with the small gear 30 mounted on the shaft 31, thereby providing a means for rotating the drum or cylinder 26. The drum or cylinder 26 is surrounded by an outer drum or casing 32 which completely closes the same and also the ends of the opening in which the cylinder or drum 26 rotates. This cylinder or casing has its forward terminal 33 tapered and provided with a straight reduced outlet opening 34 through which the peat is forced after passing through the vacuum chamber, being packed within said opening to form an air tight closure for the same. The casing or drum 32 is provided with a grate 35 on each side thereof which forms a continuation of said cylindrical casing and which is disposed on each side of the longitudinally extending opening 36, through which the chain operates which aids in breaking the vegetable cells. A cupola indicated generally as 37 is disposed above the cylinders 26 and 32 and is substantially air tight, being lined throughout with a continuation 38 of the casing or cylinder 32. The mechanism for drawing off and accumulating the gases, vapors, and the like which rise from the passing of the peat through the vacuum chamber also contains the chain which aids in breaking up the vegetable cells. This chain 39 completely stirs the peat during the passage of the same through the vacuum chamber, that is the space between the cylinder 26 and the cylindrical casing 32, and is mounted directly over the cylinders and the longitudinal opening 36.

Figures 9, 12:
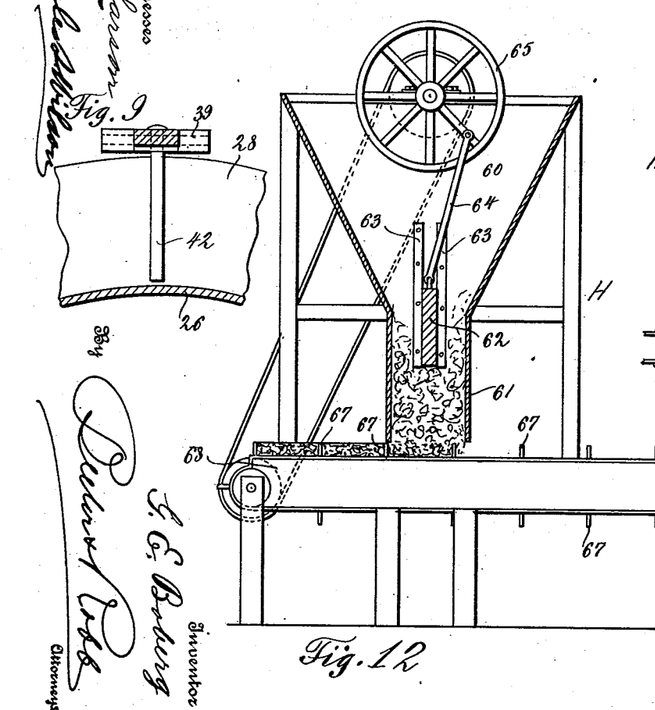
Fig. 9 is a vertical section illustrating the coöperation between the worm in the vacuum chamber, and the chain which aids in breaking the vegetable cells.
Fig. 12 is a longitudinal section, parts thereof being in elevation, of the molding machine.
Figure 10:
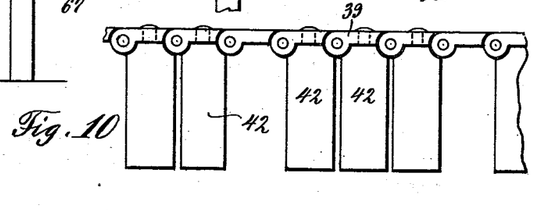
Fig. 10 is a fragmentary side elevation of the chain which aids in breaking the vegetable cells.

A pair of large guide rollers 40 are located at each end of the longitudinal passage 36 on which the chain 39 is mounted. The upper side of the chain is supported by the intermediate rollers 41 while the lower side thereof operates substantially against the gratings 35. The chain 39 carries a series of outwardly extending lugs 42, said lugs being substantially the width of the opening 36 and are rectangular in formation. These lugs are carried by the chain in sets of three, each set being adapted to operate between two of the elements of the worm and are separated by the size of one lug. It will be thoroughly understood that the rotation of the cylinder or drum 36 will cause the worm to move the chain forwardly the movement of said chain between the elements of the worm creating a stirring and breaking motion.

Figures 2, 16, 17:
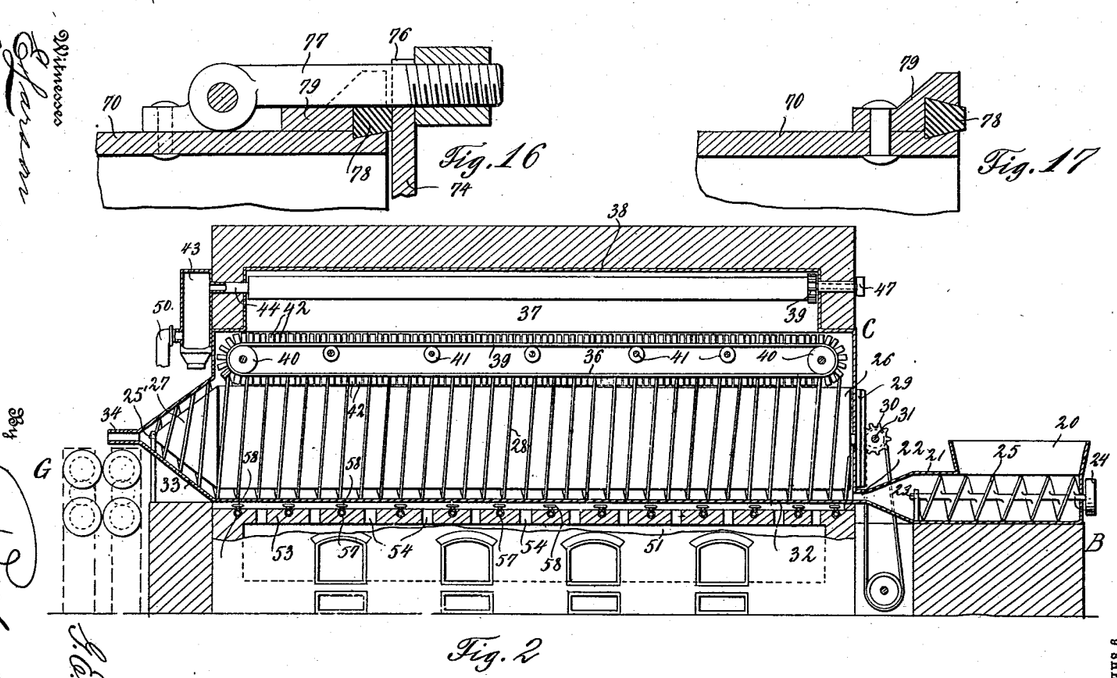
Fig. 2 is a central longitudinal section of the vacuum chamber in which the vegetable cells of the peat are broken, and from which the initial gas and vapor are accumulated.
Fig. 16 is a fragmentary longitudinal section illustrating one of the locking elements of the drying boiler.
Fig. 17 is a similar view illustrating the construction for creating an air tight closure.
Figures 3, 13:
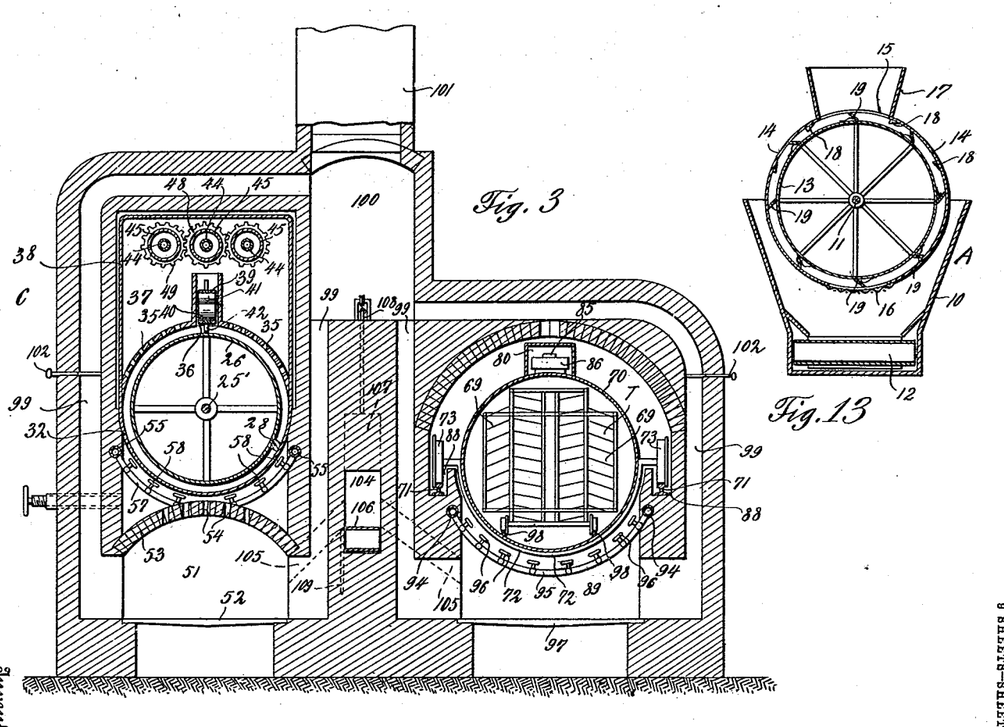
Fig. 3 is a transverse section taken through the vacuum chamber and the adjacent furnace in which the briquets are dried, and the gas formed by this process is accumulated.
Fig. 13 is a transverse section thereof.
Figures 4, 14:
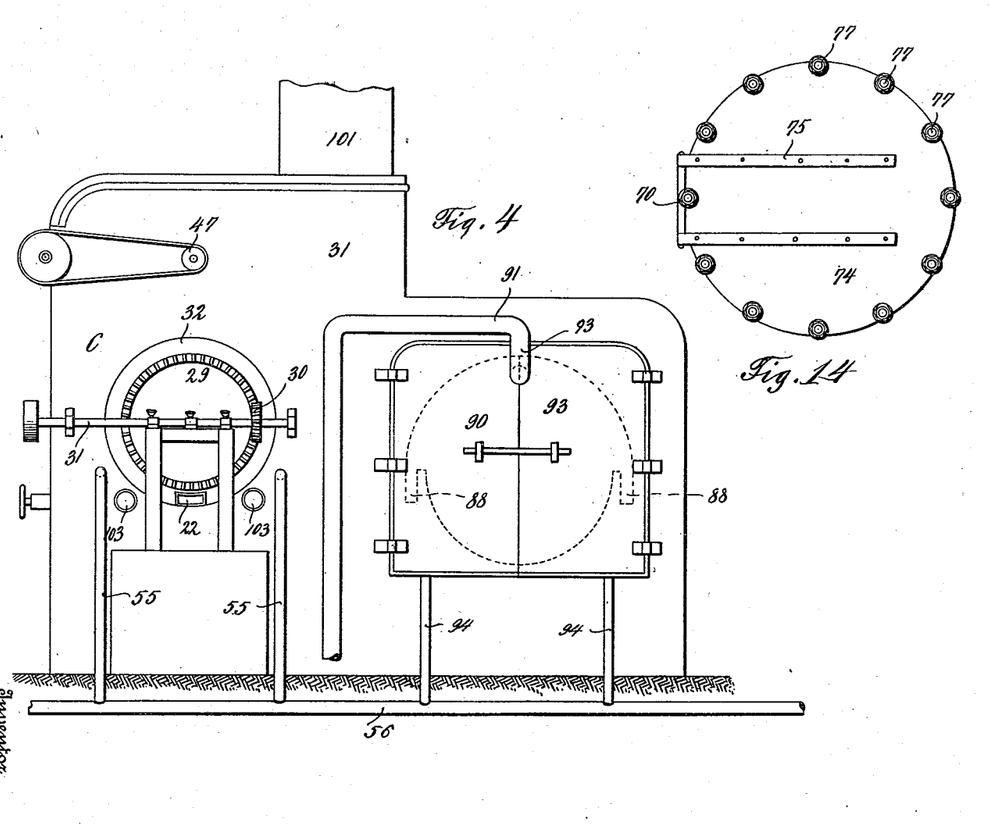
Fig. 4 is a rear end elevation illustrating the end from which the peat is fed into the vacuum chamber.
Fig. 14 is an end elevation of the drying boiler, with the hangers and wheels removed.
Figure 5:
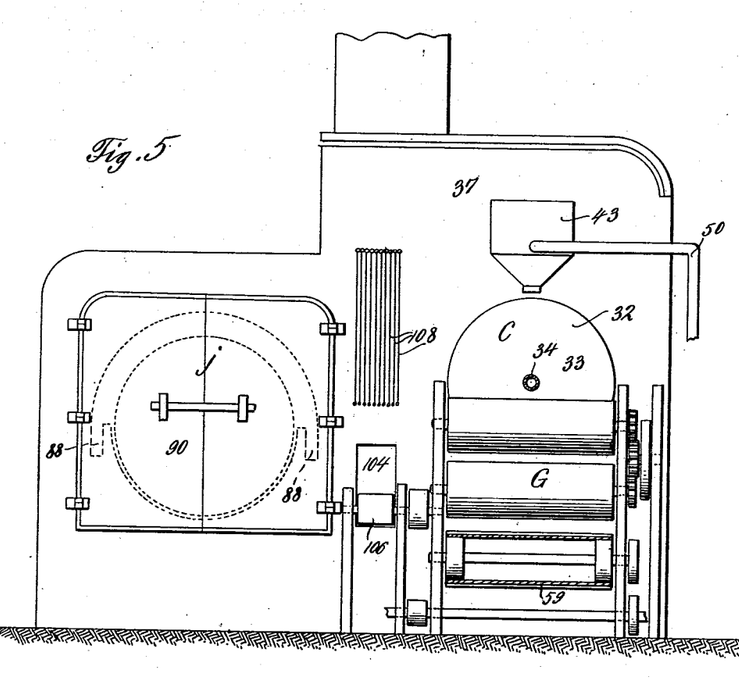
Fig. 5 is a front elevation illustrating the delivery point of the peat from the vacuum chamber.

As the cupola and space between the casing 32 and cylinder 26 are substantially air tight, and therefore an approximately perfect vacuum, the pressure within each individual vegetable cell of the peat will cause the same to burst and to liberate the pectic acid, the natural binding material of the peat, and all water which would damage the peat as a fuel. Heat is applied under the casing 32, and as compounds boil in vacuum chambers at a very low pressure, the mass of peat within the vacuum chamber would in reality be boiling, passing off the pectic acid, water and gases as vapors which ascend through the gratings 35 into the cupola 37, the body of the peat being retained within the space between the cylinder or drum 26 and the casing 32 by the grating.

Figure 6:
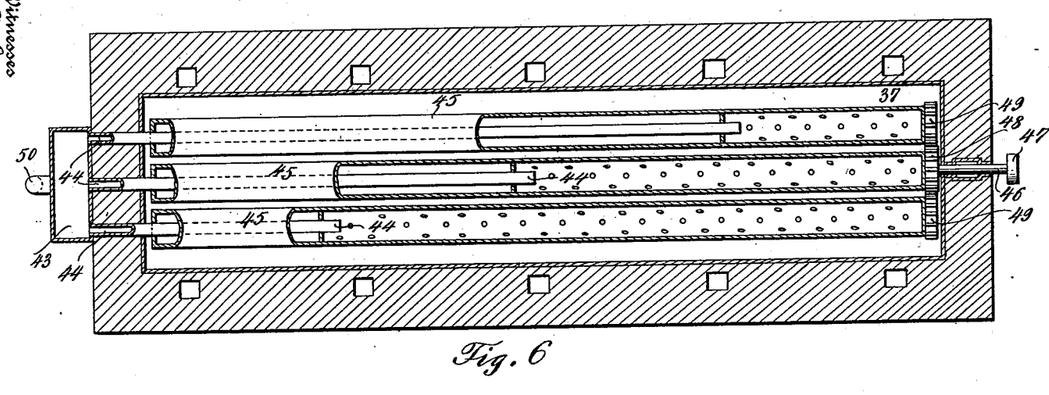
Fig. 6 is a top plan view illustrating the means whereby the gas and vapors are conducted from the vacuum chamber.
Figure 7:
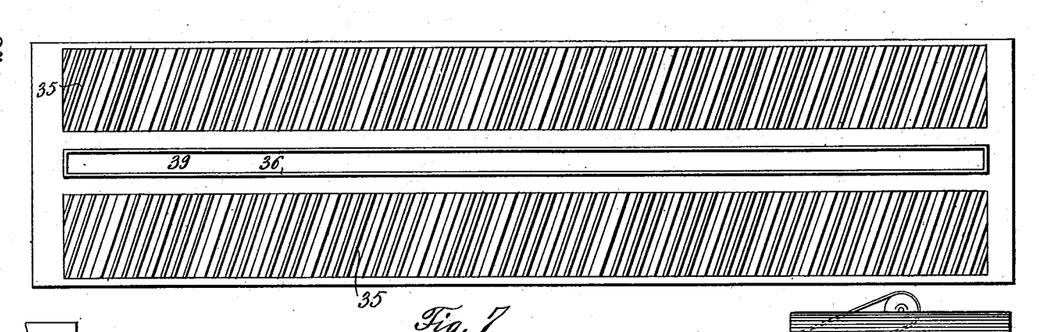
Fig. 7 is an elevation of the grate disposed below the mechanism illustrated in Fig. 6 to prevent the peat being drawn from the vacuum chamber.
Figure 8:
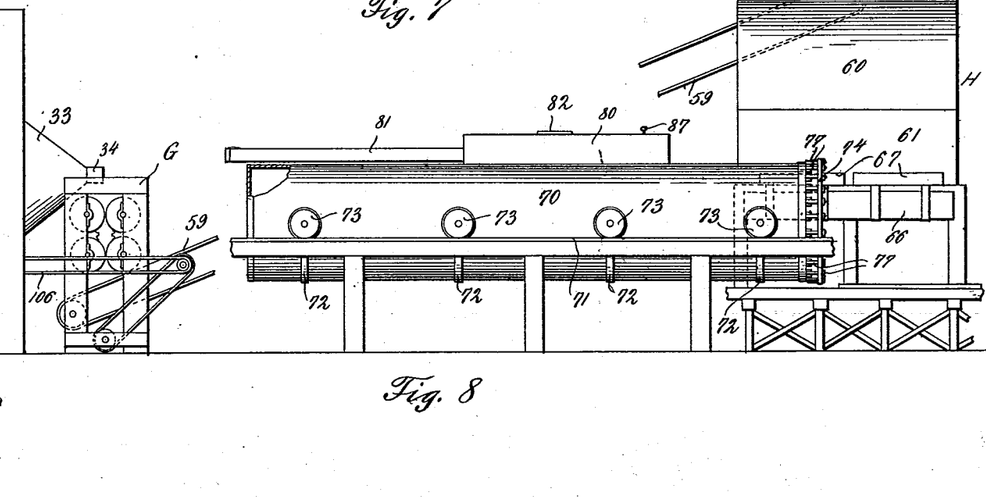
Fig. 8 is a side elevation, parts thereof being in section, illustrating the coöperation of the vacuum chamber with the molding mechanism and the coöperation of the latter with the drying boiler.

To provide a means whereby the vapors, gases and the like contained in the cupola 37 may be removed therefrom, a reservoir 43 is mounted centrally in the forward extremity of said cupola, said reservoir having three pipes 44 extending inwardly there from, one of said pipes extending two-thirds of the entire length of the cupola, the intermediate pipe extending one-half the length of the cupola, and the third pipe extending one-third the length of the cupola. These pipes are surrounded by the tubes 45, the center of said tubes being mounted on the shaft 46 which extends through the rear end of the cupola and is driven through the instrumentality of the pulley 47, said shaft carrying a gear 48 adjacent to the end of the tube. This gear 48 meshes with the gears 49 carried by the adjacent terminals of the remaining tubes and is adapted to rotate said tube. In order that the tubes may conduct the vapors and gases in the cupola to the pipes 44, the tubes are provided with a series of perforations between the ends of the pipes 44 and the rear terminals of the tubes. A pipe 50 extends from the reservoir 43 to the vacuum pump which exhausts the gases from said reservoir and the pipes 44. A furnace indicated generally as 51 is located directly below the outer casing 32 and is provided with a grate 52 of the usual construction. This furnace 51 is provided with an upwardly curved brick roof 53, which is perforated by a series of openings 54 through which the heat from the fuel burning on the grate 52 is conducted. In order that the gas may be used as a fuel to transmit heat to the vacuum chamber, a pair of longitudinal pipes 55 extend through the entire length of the furnace on each side of the casing 32 from a supply pipe 56 located at the rear terminal of the vacuum chamber, and have interposed therebetween a series of transverse and downwardly curved pipes 57 which are provided with a plurality of burners 58 which rest directly under the casing 32. As the peat passes from the delivery opening 34 of the vacuum chamber C, it drops upon the rollers G between which it passes, having the surplus water therein squeezed therefrom.

A serious defect in the operation of previous processes of treating peat has arisen in the failure to eliminate from the mass, prior to forming the same into briquets, all water, both "loose" and "latent". In respect to raw peat in the bog, it may be noted that the material comprises 87½% water and 12½% solid matters. With respect to air dried peat, the 87½% of water above referred to is decreased to about 30%, and this 30% includes 26.7% chemically combined or latent water, and 3.3% of what might be called loose water. In all peat, ordinarily, there are these two waters, loose and latent, the former being adapted to be drained off. In the practice of the present process, the operation of the rollers G affords a mechanical operation for squeezing or removing the major portion of the water remaining in the peat, after it has passed through the vacuum chamber. This step in the process is of primary importance, when it is borne in mind that prior processes have failed to produce a commercial product, simply because the briquets having the highest combustible properties can not be produced without expressing the water by mechanical means, prior to the formation of said briquets. As mentioned above, the major portion of the latent water is removed by the mechanical operation of the rollers G, but a small percentage of water remains in the peat even after the same has been operated upon by said rollers. Such small percentage is finally removed during the passage of the briquets through the extracting boiler by vaporizing and escaping with the gases through the safety valve of said boiler. The vaporization is readily effected when it is recalled that the temperature in the extracting boiler is approximately 572° F. The peat when formed into briquets and passed through the extracting boiler is therefore a hard dense product in the best possible condition for use as fuel. At this point in the process, the peat is in a condition to use as fuel and a portion thereof is consequently fed to the furnace as hereinafter more fully described. These rollers are of any desirable construction and are brought into contact by suitable means not shown and are adapted to rotate in the same direction through the instrumentality of idler gears interposed between the main gears thereof.

The majority of the peat is delivered from the rollers G upon the carrier 59 which is located directly under said rollers, and delivers the peat to the hopper 60 of the molding machine H. The hopper of this molding machine is located longitudinally with respect to the carrier 59 while the carrier which removes the briquets from said machine operates transversely to the carrier 59 and is adapted to deliver the briquets to the drying trucks as hereinafter more fully described. The lower end of the hopper 60 is provided with a reduced outlet opening 61 into which the peat is tightly packed by a plunger 62 moving vertically in the guides 63 located on each side of the hopper, said plunger extending completely across said hopper. The vertical movement of the plunger 62 is provided by a link 64 connecting the upper side of the plunger 62 to a driving wheel 65 located adjacent to the upper extremity of said hopper. As the link 64 is secured to the driving wheel 65 adjacent to the periphery thereof, the rotation of said driving wheel imparts a vertical motion to the plunger 62 thereby packing the peat firmly into the reduced outlet opening 61.

A carrier 66 is located directly below the outlet opening 61 of the hopper 60, the body of said carrier being spaced from the lower terminal of the outlet opening. The carrier is provided with a series of upwardly extending plates 67 which are adapted to pass under the outlet opening 61, and which take up the space existing between the body of the carrier 66 and the bottom of the outlet opening 61. These plates are adapted to cut off a certain amount of peat which projects from the outlet opening 61 and retain the same in the carrier until the briquets are located adjacent to the terminal of said carrier farthest from the molding machine where they are removed and placed upon drying trucks hereinafter more fully referred to. It will be understood that the hopper 61 can be of any length and that the carrier 66 may be of any width thereby forming as many briquets as desired. A side plate 68 is located on each side of the carrier adjacent to the upper side thereof and prevents the peat from overflowing said carrier.

The drying trucks indicated generally as T are of any suitable construction, but preferably the construction illustrated in Fig. 3, said trucks being provided with a plurality of sloping shelves 69, each tier of shelves being retained in spaced relation so that the heat to which the briquets are finally subjected will thoroughly circulate about each briquet. These trucks T are placed within the drying or extracting boiler 70 which operates upon the tracks 71 extending from the end of the conveyer through the drying or extracting furnace J. This boiler 70 is circular in formation and of such a length that the same may entirely fill the drying furnace J. A series of hangers 72 are located on the under side of said boiler and carry at their terminals the wheels 73 which operate upon the tracks 71. The forward terminal of the boiler 73 is completely closed while the rear terminal thereof is provided with a door 74, said door being hinged to one side of the furnace by the hinges 75 which extend substantially completely across the door. The periphery of the door 74 is provided with a series of depressions or recesses 76 in which are received the hinged locking clamps 77 pivoted to the body of the boiler. In order to make the door 74 substantially air tight, a gasket 78 is clamped to the rear terminal of said boiler by the retaining ring 79, said gasket projecting slightly beyond the terminal of the boiler, and adapted to bear against the inner surface of said door.

Figure 18:
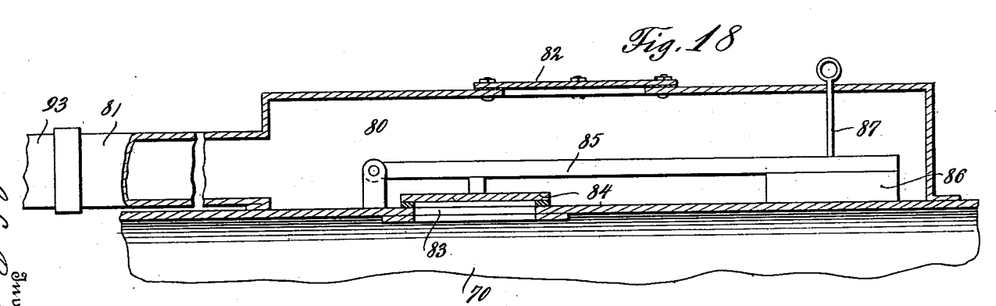
Fig. 18 is a longitudinal section of the safety valve carried by the drying boiler.

The top of the boiler 70 is provided with a casing or chamber 80 to which is connected the forwardly extending pipe 81, which extends to and beyond the forward terminal of said boiler. The casing 80 is provided with a manhole 82 in the top thereof, through which access may be had to said casing for adjusting the valve mechanism therein. An opening 83 extends from the casing 80 to the interior of the boiler 70 and is covered by an air tight valve 84, said valve being connected to a pivotal arm 85 which carries at its free terminal the weight 86, said weight being provided with a handle 87 which projects through the casing 80. This balance valve is adapted to resist pressure under four hundred pounds per square inch, but will open at four hundred pounds or over, thus permitting the gas accumulated within the boiler 70 to pass through the opening 83 into the casing 80 and out the pipe 81. After the trucks T have been placed in the boiler, the same is run into the extracting or drying furnace J which subjects said boiler to heat sufficient to drive off the remaining accumulating gases within the briquets, and to cause the natural binding material in the peat to mold the briquets in such a manner that when the same are removed from the boiler they will be firm and dry.

Figure 19:
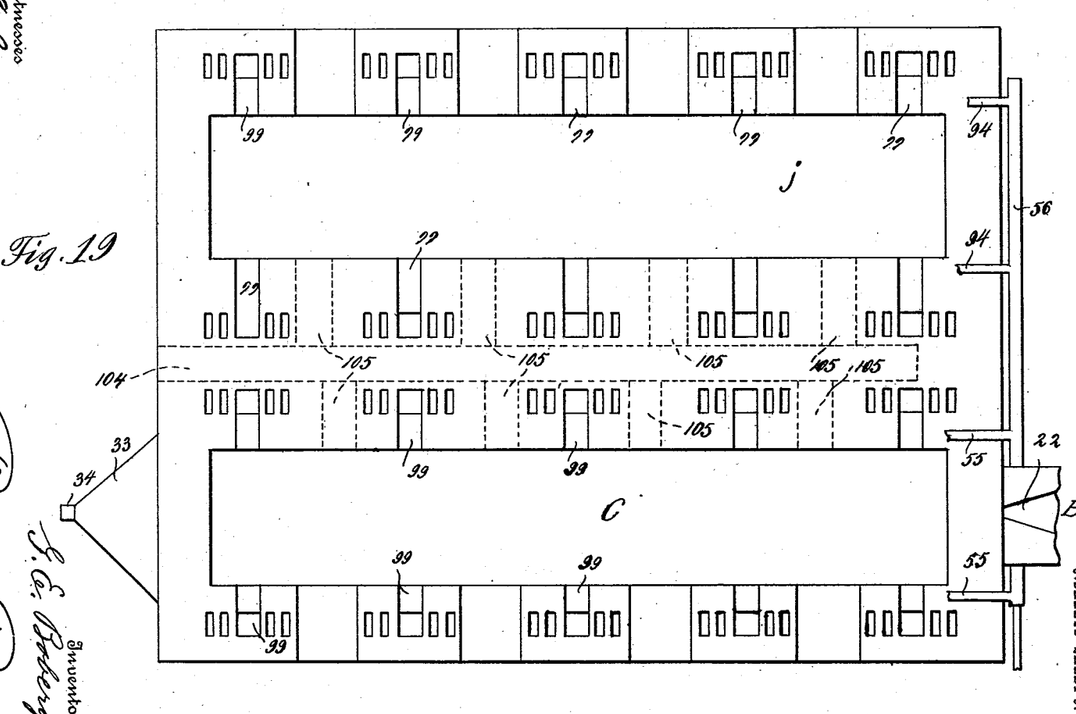
Fig. 19 is a diagrammatic section illustrating the relation between the drying furnace and the vacuum chamber, and also the arrangement of the smoke conduits and stoking openings.

The extracting furnace J is located adjacent to the vacuum structure C and is constructed in the same building therewith. Each side of the drying furnace is provided with a depression 88 through which the tracks 71 extend so that the boiler 70 is located directly over the furnace 89. Each end of the furnace J is provided with the double doors 90, the doors at the forward end of said furnace, that is the doors adjacent to the outlet opening of the vacuum chamber C, are pierced by the pipe 91 which extends to the pipe 92 leading from the vacuum pump to the purifying apparatus E. This pipe 91 is provided with an automatic flexible connection 93 which engages the forward terminal of the pipe 81. Thus, as the gases leave the extracting boiler 70 they are exhausted through the purifying apparatus E to the tank F where they are retained. When so desired, the heat may also be applied to the furnace J by the gas conducted from the tank F, said gas passing from the supply pipe 56 to the pipes 94 which extend longitudinally on each side of the furnace throughout the entire length thereof and have interposed therebetween the downwardly curved pipes 95 which carry the gas burners 96 located directly below the extracting boiler 70 when the same is in the furnace J. The furnace J is provided with the grate 97 of any suitable structure, on which the peat rests when the same is used as a fuel. The boiler 70 is provided throughout its entire length with tracks 98 on which the trucks operate when the same are placed within the boiler.

Smoke conduits for the furnace J and the vacuum chamber C are somewhat similar in construction to the conduits and drafts of the ordinary old fashioned brick oven. The smoke conduits 99 extend from each side of the fire boxes 51 and 89 of the vacuum chamber C and furnace J respectively, and lead upwardly into the smoke chamber 100 which opens into the smoke stack 101. These smoke conduits are provided with the drafts 102 which are operated from the forward terminal of the structure by the valve rods 103.

The mechanism for feeding the peat into the fire boxes 51 and 89 of the vacuum and drying furnace respectively comprise a longitudinal passage 104 extending throughout the entire length of the building containing said vacuum chamber and drying furnace, and is located between said members. A series of divergent passages 105 extend from the passage 104 to the fire boxes 51 and 89 and are adapted to conduct the fuel being carried through the passage 104 to said fire boxes. A carrier 106 operates throughout the entire length of the passage 104 and is adapted to conduct the peat into said passage, the peat being delivered upon said carrier from the compression rollers G through any suitable mechanism. In order to force the peat from the carrier into the passages 105 and thence to the fire boxes, a shutter 107 reciprocates directly through said passage in the partition between the vacuum chamber C and the furnace J, and is operated by the cords 108 extending through the smoke chamber 100 to the forward end of the furnace. This shutter carries a side shutter 109 which normally closes the passages 105 when the shutter 107 is raised. When the shutter 107 is dropped to close the passage 104 and guide the peat down the corresponding passage 105, the shutter 109 likewise drops, opening said passage 105.

It will readily be seen from this construction that the process and apparatus of the present invention takes the peat in the raw state, removes the foreign and objectionable matter therein, breaks the vegetable cells and forms the peat into blocks or briquets ready for the market. At the same time this process accumulates the gas and purifies it in such a manner that the same may be used for heat and illuminating purposes.

Having thus described the invention, what is claimed as new is:

1. The hereindescribed method of preparing peat for the market consisting in the removal of all foreign matter therefrom, at the same time adding a liquid, passing the product through a vacuum chamber, subjecting said vacuum chamber to heat, thereby boiling the peat, molding said peat, after it passes from said vacuum chamber, into briquets, and then drying said briquets, extracting the gases passed off during the passage through the vacuum chamber and also during the drying operation.

2. The hereindescribed method of preparing peat for the market consisting in passing the peat through a vacuum chamber, subjecting said vacuum chamber to heat, thereby boiling the peat and breaking the vegetable cells of said peat during the passage through said vacuum chamber, molding the product into briquets after the passage through the vacuum chamber, and drying said briquets, and extracting the gases given off by said peat during the passage through said vacuum chamber, and also during the drying operation.

3. The hereindescribed method of preparing peat for the market consisting in passing the peat through a vacuum chamber, subjecting the vacuum chamber to heat, thereby boiling the peat, breaking the vegetable cells of said peat during the passage through said vacuum chamber, molding the product of the passage through the vacuum chamber into briquets, and drying said briquets, and extracting the gases given off by said peat during the drying operation.

In testimony whereof I affix my signature in presence of two witnesses.

GUSTAF E. BOBERG.

Witnesses:
F. R. ENRIGHT,
J. ENNIS.

---

Copies of this patent may be obtained for five cents each, by addressing the "Commissioner of Patents, Washington, D. C."